July 29, 1969     R. J. DIEFENDORF     3,458,341
METAL BORIDE-METAL CARBIDE-GRAPHITE DEPOSITION
Filed Aug. 10, 1964
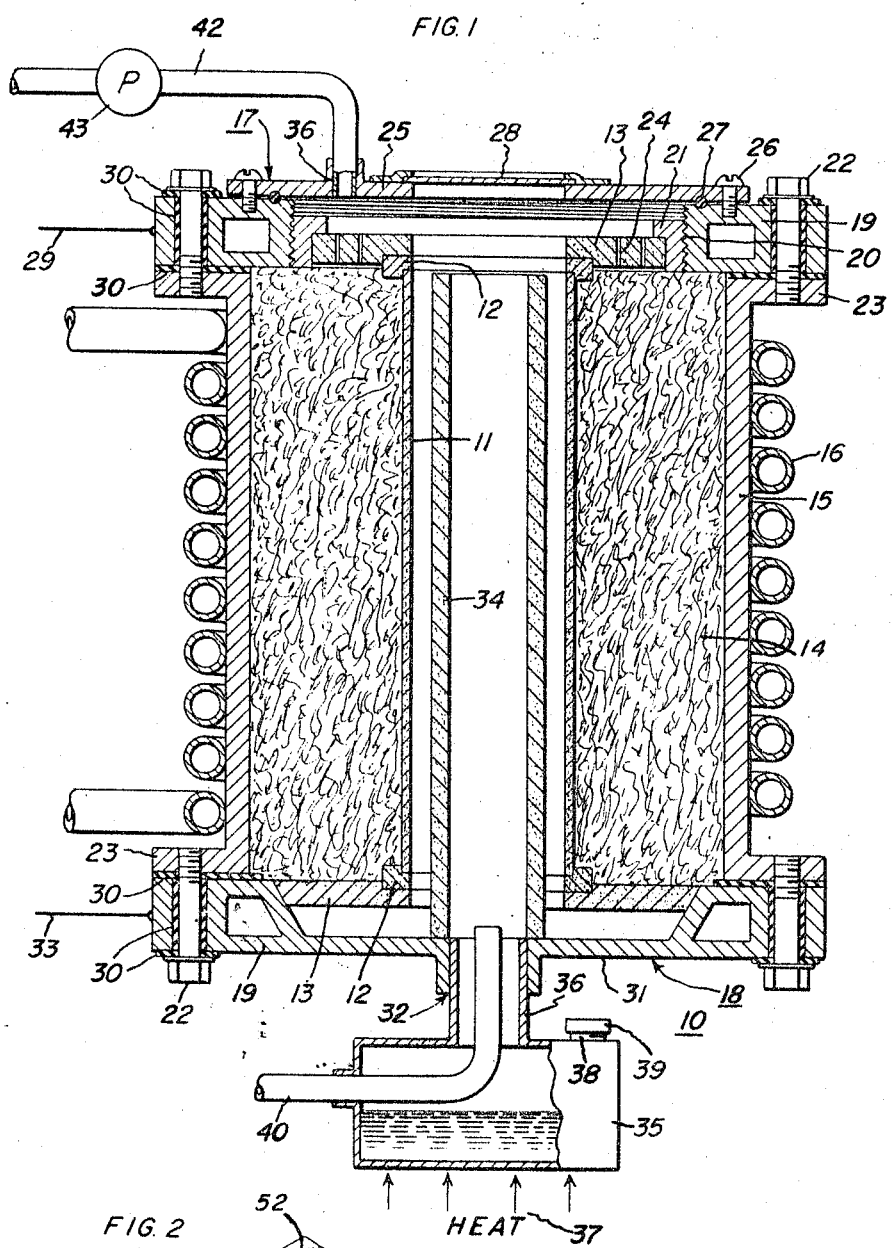
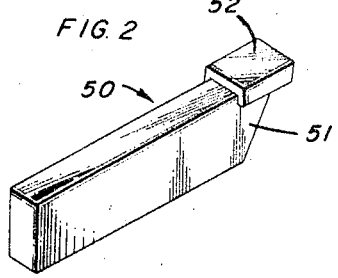
Inventor:
Russell J. Diefendorf,
by Paul R. Webb, II
His Attorney.

United States Patent Office 3,458,341
Patented July 29, 1969

3,458,341
METAL BORIDE-METAL CARBIDE-GRAPHITE DEPOSITION
Russell J. Diefendorf, Ballston Spa, N.Y., assignor to General Electric Company, a corporation of New York
Filed Aug. 10, 1964, Ser. No. 388,566
Int. Cl. C23c 11/10, 1/10, 13/00
U.S. Cl. 117—46                                      6 Claims

ABSTRACT OF THE DISCLOSURE

A metallic boride-graphite deposit which may include metal carbide is formed by use of an operating temperature of 1300° C. to 2500° C. and a pressure of from 0.5 to 100 millimeters of mercury employing a gaseous metal compound such as a metal halide, metal carbonyl or organometallic, a second gaseous compound such as boron trichloride or trimethylborate and a third gaseous material which is a hydrocarbon.

---

This invention relates to composite articles, coatings and methods of forming composite articles and coatings, and more particularly to pyrolytic metallic carbide-graphite composite articles, metallic boride-graphite composite articles, coatings and methods of forming such articles and coatings.

Pyrolytic articles and coatings are defined as materials made from gases by thermal decomposition or from materials formed by evaporation and deposition on a surface. Carbonaceous gases have been thermally decomposed and deposited on a surface to produce a pyrolytic graphite article or coating. As a result of the decomposition, carbon is removed from the gas and deposits on the surface so that planar graphite crystallites are aligned into a layer structure.

In my copending United States patent application Ser. No. 388,565, now abandoned, filed Aug. 10, 1964, and assigned to the same assignee as the present application, there is described and claimed pyrolytic boron carbide-graphite composite articles, coatings and methods of making such articles and coatings. Such articles and coatings are useful as cutting tools since they are hard, strong and extremely wear-resistant. It would be desirable to provide metallic carbide-graphite composite articles and coatings, and metallic boride articles and coatings which exhibit hardness, strength and wear-resistance for utilization, for example, as cutting tools. The present invention is directed to such improved composite articles, coatings and methods of forming.

It is an object of my invention to provide a pyrolytic metallic carbide-graphite composite article.

It is another object of my invention to provide a pyrolytic metallic carbide-graphite composite coating on a high temperature member thereby forming a composite article.

It is another object of my invention to provide a deposition method of forming a pyrolytic metallic carbide-graphite composite article.

It is another object of my invention to provide a deposition method of forming a pyrolytic metallic carbide-graphite composite coating on a high temperature member thereby producing a composite article.

It is a further object of my invention to provide a pyrolytic metallic boride-graphite composite article.

It is a further object of my invention to provide a pyrolytic metallic boride-graphite composite coating on a high temperature member thereby forming a composite article.

It is a further object of my invention to provide a deposition method of forming a pyrolytic metallic boride-graphite composite article.

It is a still further object of my invention to provide a deposition method of forming a pyrolytic metallic boride-graphite composite coating on a high temperature member thereby producing a composite article.

In carrying out my invention in one form, a composite article comprises a graphite matrix, and an extremely fine dispersion of a metallic carbide in said matrix, said metallic carbide being present in an amount from 0.5 atomic percent to 95 atomic percent of the article.

These and various other objects, features and advantages of the invention will be better understood from the following description taken in connection with the accompanying drawing in which:

FIGURE 1 is a sectional view of a deposition apparatus for forming pyrolytic metallic carbide-graphite composite articles, pyrolytic metallic boride-graphite composite articles, and coatings in accordance with my invention and FIGURE 2 is an isometric view of a cutting tool consisting of a shank to which is affixed a tool element prepared by the method of this invention.

In FIGURE 1 of the drawing, a deposition apparatus shown generally at 10 comprises a central heating element 11 of high temperature material in the form of a hollow tubular configuration of commercial graphite. Other solid or hollow configurations of high temperature material may also be employed for the heating element. At each end of heating element or tube 11 is positioned a pyrolytic graphite electrode 12 in mechanical and electrical contact therewith. Each of these electrodes 12 is shown in the form of a ring with a flange fitting against the end of tube 11. However, any suitable electrode configuration can be employed. A graphite electrode 13 which has a larger length-to-area ratio for the electric current path is positioned adjacent electrode 12 and in electrical contact therewith. In FIGURE 1 of the drawing, pyrolytic graphite electrode 12 and graphite electrode 13 form an electrode assembly for constant heating of graphite tube 11 during the operation of apparatus 10.

Tube 11 is insulated from heat loss by suitable insulation 14 in the form of a blanket of graphite felt or thermal black. An outer metallic casing 15, for example, of brass, is positioned around insulation 14. Casing 15 is suitably cooled by water coils 16 surrounding the casing. At opposite ends of the casing 15, there is provided end cover structures 17 and 18 which each include a water-cooled electrode 19 in electrical contact with electrode 13. Electrode 19 is threaded at its inner periphery 20. An inner ring member 21 is threaded to threads 20 of electrode 19. A plurality of bolts 22 are inserted through the openings in cover 17 and threaded into openings in upper flange 23 of casing 15 to mechanically position upper graphite electrode 13 against electrode 12. Upper electrode 13 is also provided with a plurality of openings 24 to provide passageways to insulation 14. A plate 25 is affixed as by screws 26 to the upper surface of member 20. An O ring 27 is provided near the outer periphery of plate 25 to produce an effective seal. A viewing window 28 is shown positioned centrally in plate 25.

An electrical lead 29 is shown in electrical contact with water-cooled electrode 19. The lead is connected to one terminal of a power source (not shown). Cover 17 is secured to the upper end of casing 15 by means of a plurality of bolts 22 which are inserted through a plurality of openings in cover 17 and which are threaded in threaded openings in a flange 23 on the upper end of casing 15. Electrically and thermally insulating material 30 is provided between cover 17 and flange 23, and within and surrounding openings in cover 17.

Lower cover 18 has a water-cooled electrode 19 near its outer periphery. Cover 18 has a central plate portion 31 with a centrally located aperture 32 therein. A plurality of bolts 22 are inserted through openings in lower cover 18 and are threaded in threaded openings in lower flange 23 of casing 15 to secure lower cover 18 to casing 15. Insulation 30 can also be provided between cover 18 and flange 23 and within and surrounding the openings in cover 18. A second lead 33 is connected to water-cooled electrode 19 in cover 18 and to the other terminal of the power source (not shown) to complete the electrical circuit to the furnace. The inner periphery of the water-cooled electrode 19 is tapered inwardly towards casing 15 to provide support for graphite electrode 13 which is tapered in similar fashion and fits thereagainst.

A graphite tube 34 is shown positioned within tube 11 for the purpose of depositing a pyrolytic metallic carbide-graphite composite article, a pyrolytic metallic boride-graphite composite article or a coating of one of these materials on the interior surface of tube 34. A boiler 35 communicates with the interior of tube 34 by means of a tube portion 36 positioned in aperture 32. Heat is provided as at 37 from any suitable source (not shown) to boiler 35 to heat its contents, which are in a solid or a liquid state and convert the solid or liquid to a gas. An inlet line 38 with a cover 39 is provided for boiler 35 whereby the solid or liquid is supplied thereto. A gas inlet line 40 extends through boiler 35 and its tube portion 36 to communicate with the interior of tube 34. Line 40 is connected to suitable sources of materials for providing gases. At the upper end of apparatus 10, a tube 42 is positioned in an opening 41 and connected to a pump 43 to provide for evacuation of apparatus 10 to a desired subatmospheric condition during operation.

I discovered unexpectedly that a pyrolytic metallic carbide-graphite composite article was formed by providing at least one member in a chamber, evacuating the chamber, heating the chamber to a temperature in the range of 1300° C. to 2500° C., providing a mixture of a carbide forming metal and carbon from materials containing a carbide forming metal and carbon, maintaining the chamber at a pressure from 0.5 to 100 millimeters of mercury, flowing the mixture through the chamber wherein a metallic carbide-graphrite composite article is deposited on the member, and removing the composite article from the member. I found further that a pyrolytic metallic carbide-graphite composite article was also formed which comprises the above method steps except for the removal of the composite article from the member. Thus, this article comprises a member of high temperature material, such as graphite, and a metallic carbide-graphite composite coating on at least one surface thereof. The pyrolytic metallic carbide-graphite composite material forming the article or the coating comprises a graphite matrix, and an extremely fine dispersion of metallic carbide in the matrix. The metallic carbide is present in an amount from 0.5 atomic percent to 95 atomic percent of the article or coating.

I found that the chamber should be heated to a temperature in the range of 1300° C. to 2500° C. and preferably from 1800° C. to approximately 2000° C. However, the flow rate of the gases and the chamber geometry must be selected to avoid cracking of the composite article. In the preferred temperature range of 1800° C. to approximately 2000° C. such selection is not necessary. An article or a coating produced in accordance with this method is strong, hard, and extremely wear-resistant, which renders it extremely suitable for a cutting tool. These desirable properties are incorporated into the article or coating by the presence of the metallic carbide as a second phase in the metallic carbide-graphite composite article.

Various materials containing a carbide forming metal and carbon, which can be employed in my deposition method, include metal halides, metal carbonyls, and organometallics to provide the carbide forming metal and include methane and xylene to provide the carbon component. Suitable metal halides include silicon tetrachloride, hafnium tetrachloride and tantalum pentachloride. Suitable metal carbonyls include molybdenum carbonyl and tungsten carbonyl. Suitable organometallics include trimethylchlorosilane, dimethyldiborane, and zirconium cyclopentadienyl.

In the above latter type of articles wherein metallic carbide-graphite composite coating adheres to a member of high temperature material, various high temperature materials may be employed. Such a high temperature material is defined as a material which can be subjected to elevated temperatures during deposition without adverse effect to its solid state condition. Such a material is not useable if it melts or vaporizes in the operating temperature employed and would not therefore be a high temperature material. Various high temperature materials other than graphite can be employed. Molydenum is suitable to 2100° C. while tungsten is suitable to 2500° C. It will also be appreciated that a material suitable for a higher temperature range may also be employed in the temperature range of this deposition process.

Thus, for example, a cutting element can be prepared by the practice of this invention and affixed in some manner (permanently or temporarily) to a tool shank for mounting in a tool holder (not shown). Such a tool 50 is shown in FIGURE 2 and consists of a tool shank 51 to which has been affixed, as by brazing, the cutting element 52 (a body of high temperature material on which has been deposited on adherent coating according to the teachings herein).

I discovered unexpectedly also that a pyrolytic metallic boride-graphite composite article was formed by providing at least one member in a chamber, evacuating the chamber, heating the chamber to a temperature in the range of 1300° C. to 2500° C., providing a mixture of a boride forming metal, boron and carbon, from materials containing a boride forming metal, boron and carbon, maintaining the chamber at a pressure from 0.5 to 100 mm. of mercury, flowing the mixture through the chamber, wherein a metallic boride-graphite composite article is deposited on the member, and removing the composite article from the member.

I found further that a pyrolytic metallic boride-graphite composite article was also formed which comprises the above method steps except for the removal of the composite article from the member. Thus, this article comprises a member of high temperature material, such as graphite, and a metallic boride-graphite composite coating on at least one surface thereof. The pyrolytic metallic boride-graphite composite material forming the article or the coating comprises a graphite matrix, and an extremely fine dispersion of metallic boride in the matrix. The metallic boride is present in an amount from 0.5 atomic percent to 95 atomic percent of the article or coating.

An article or coating of pyrolytic metallic boride-graphite composite material produced in accordance with this method is strong, hard, and extremely wear resistant, which renders it extremely suitable for a cutting tool. As in the formation of the pyrolytic metallic carbide-graphite composite articles similar conditions are employed. The same materials to form the carbide forming metals are also employed to provide the boride forming metals. The same materials containing carbon are also employed. Various materials containing boron components, which can be employed in this latter deposition method, include boron trichloride, and trimethylborate. The same high temperature materials are also employed for the high temperature member.

I discovered unexpectedly also that a pyrolytic metallic carbide-boride-graphite composite article is also formed as described in the above method for the formation of a pyrolytic metallic carbide-graphite composite article or a pyrolytic metallic boride-graphite composite article. In the formation of the metallic carbide-boride-graphite composite article, the metallic carbide is present in addition to the metallic boride by introducing an additional amount of the carbide forming metal. This is accomplished for example by increasing the vapor pressure of the metallic halide through an increase in the temperature to which the metallic halide is heated prior to its introduction into tube 34.

In the operation of the deposition apparatus in the single figure, the chamber is evacuated. Power is supplied to leads 29 and 33 to heat tube 11 and the chamber formed thereby, and tube 34 to a temperature in the range of 1300° C. to 2500° C. For example, boron trichloride to provide the boron component and methane to provide the carbon component are supplied through inlet line 40 to provide a mixture of boron and carbon into the interior of tube 34. Hafnium tetrachloride is heated in boiler 35 to a temperature of 200° C. to provide the carbide forming metal, hafnium, to the interior of tube 34. The chamber is maintained at a pressure in the range of 0.5 mm. of mercury to approximately 20 mm. of mercury. This mixture of hafnium, boron, and carbon is flowed through the chamber and deposits on the interior surface of tube 34 as a pyrolytic hafnium boride-graphite composite article or coating. Pump 43 maintains the selected pressure in chamber 11 while it removes the products of the reaction therefrom.

After a particular thickness of the pyrolytic hafnium boride-graphite composite material has been formed on the interior of the high temperature graphite member in the form of tube 34, the heating and gas supplies are discontinued. The chamber is allowed to cool to room temperature after which the pressure is restored to atmospheric pressure. Apparatus 10 is opened and tube 34 coated on its interior surface with a hafnium boride-graphite composite coating is removed from chamber 11.

If it is desired to provide a pyrolytic metallic boride-graphite composite article, tube 34 is removed from the deposited composite material to provide the composite article. If on the other hand it is desired to have a composite article which includes a high temperature member, such as graphite, with a pyrolytic boride-graphite composite coating thereon tube 34 is not removed. If desired, the composite coating is deposited on a plate or other configuration of high temperature material in accordance with the above method.

In the further operation of the deposition apparatus as shown in FIGURE 1 of the drawing, pyrolytic metallic carbide-graphite composite articles are produced. Similarly, pyrolytic metallic carbide-boride-graphite composite articles are also produced. As it was discussed above in the initial operation of the apparatus composite articles are formed which include or exclude a high temperature member of material such as graphite.

Several examples of composite articles which are made in accordance with the method of the present invention are as follows:

EXAMPLE I

A deposition apparatus was set up in accordance with FIGURE 1 of the drawing. A graphite tube was positioned in the chamber of the apparatus. The chamber, including the interior of the tube, was evacuated to a pressure of 0.025 mm. of mercury. Power was supplied through the electrical leads to the electrodes to heat the chamber to a temperature of 1700° C. Silicon tetrachloride was supplied at the rate of 0.073 cubic foot per hour through the inlet line to the chamber to provide the carbide forming metal, silicon. Methane was supplied at the rate of 1.8 cubic feet per hour through the inlet line to the chamber to provide the carbon component. The pressure in the chamber was maintained at 20 mm. of mercury. The mixture of silicon and carbon derived from silicon tetrachloride and methane flowed through the chamber for a period of 3.5 hours wherein a silicon-carbide-graphite coating was deposited on the interior surface of the graphite tube.

The heat and gas supplies were discontinued. After the chamber was cooled to room temperature, the pressure was increased to atmospheric pressure and the apparatus was opened. The graphite member with the composite article deposited thereon was removed from the chamber. The resulting composite article comprised a graphite tube and a silicon carbide-graphite composite coating on the interior surface thereof. The silicon carbide-graphite composite coating consisted of a graphite matrix and an extremely fine dispersion of silicon carbide in the matrix, the silicon carbide being present in an amount of 20 atomic percent of the coating.

EXAMPLE II

A deposition apparatus was set up in accordance with FIGURE 1 of the drawing. A graphite tube was positioned in the chamber of the apparatus. The chamber, including the interior of the tube, was evacuated to a pressure of 7 mm. of mercury. Power was supplied through the electrical leads to the electrodes to heat the chamber to a temperature of 1950° C. Hafnium tetrachloride was supplied from a boiler heated at 200° C. through a tube to the chamber to provide the carbide forming metal, hafnium. Methane was supplied at the rate of 0.5 cubic foot per hour through the inlet line to the chamber to provide the carbon component. Boron trichloride was supplied at the rate of .005 cubic foot per hour through the inlet line to the chamber to provide the boron component. The mixture of hafnium, boron and carbon derived hafnium tetrachloride, boron trichloride and methane flowed through the chamber for a period of seven hours wherein a hafnium boride-graphite coating was deposited on the interior surface of the graphite tube.

The heat and gas supplies were discontinued. After the chamber was cooled to room temperature, the pressure was increased to atmospheric pressure and the apparatus opened. The graphite member with the composite article deposited thereon was removed from the chamber. The resulting composite article comprised a graphite tube and a hafnium boride-graphite composite coating on the interior surface thereof. The hafnium boride-graphite composite coating consisted of a graphite matrix and an extremely fine dispersion of hafnium boride in the matrix.

EXAMPLE III

A deposition apparatus was set up in accordance with FIGURE 1 of the drawing. A graphite tube was positioned in the chamber of the apparatus. The chamber, including the interior of the tube, was evacuated to a pressure of $10^{-2}$ mm. of mercury. Power was supplied through the electrical leads to the electrodes to heat the chamber to a temperature of 1700° C. Hafnium tetrachloride was supplied from a boiler heated at 220° C. through a tube to the interior of the graphite tube to provide the carbide forming metal, hafnium. Methane was supplied at the rate of 1.3 cubic feet per hour through the inlet line to the chamber to provide the carbon component. The pressure in the chamber was maintained at 12 mm. of mercury. The mixture of hafnium and carbon derived from hafnium tetrachloride and methane flowed through the chamber for a period of 1.5 hours wherein a hafnium carbide-graphite coating was deposited on the interior surface of the graphite tube.

The heat and gas supplies were discontinued. After the chamber was cooled to room temperature, the pressure was increased to atmospheric pressure and the apparatus was opened. The graphite member with the composite article deposited thereon was removed from the chamber. The resulting composite article comprised a graphite tube and a hafnium carbide-graphite composite coating on the interior surface thereof. The hafnium carbide-graphite composite coating consisted of a graphite matrix and an extremely fine dispersion of hafnium carbide in the matrix, the hafnium carbide being present in an amount of 10 atomic percent of the coating.

EXAMPLE IV

A deposition apparatus was set up in accordance with FIGURE 1 of the drawing. A graphite tube was positioned in the chamber of the apparatus. The chamber, including the interior of the tube, was evacuated to a pressure of $10^{-2}$ mm. of mercury. Power was supplied through the electrical leads to the electrodes to heat the chamber to a temperature of 1900° C. Hafnium tetrachloride was supplied from a boiler at 200° C. through a tube to the interior of the graphite tube to provide the carbide forming metal, hafnium. Methane was supplied at the rate of 0.5 cubic foot per hour through the inlet line to the chamber to provide the carbon component. Boron trichloride was supplied at the rate of 0.01 cubic foot per hour through the inlet line to the chamber to provide the boron component. The pressure in the chamber was maintained at 8 mm. of mercury. The mixture of hafnium, boron and carbon derived from hafnium tetrachloride, boron trichloride and methane flowed through the chamber for a period of two hours wherein a hafnium boride-graphite coating was deposited on the interior surface of the graphite tube.

The heat and gas supplies were discontinued. After the chamber was cooled to room temperature, the pressure was increased to atmospheric pressure and the apparatus was opened. The graphite member with the composite article deposited thereon was removed from the chamber. The resulting composite article comprised a graphite tube and a hafnium boride-graphite composite coating on the interior surface thereof. The hafnium boride-graphite composite coating consisted of a graphite matrix and an extremely fine dispersion of hafnium boride in the matrix, the hafnium boride being present in an amount of eight atomic percent of the coating.

EXAMPLE V

A deposition apparatus was set up in accordance with FIGURE 1 of the drawing. A graphite tube was positioned in the chamber of the apparatus. The chamber, including the interior of the tube, was evacuated to a pressure of $10^{-2}$ mm. of mercury. Power was supplied through the electrical leads to the electrode to heat the chamber to a temperature of 2000° C. Hafnium tetrachloride was supplied from a boiler at 230° C. through a tube to the interior of the graphite tube to provide the carbide forming metal, hafnium. Methane was supplied at the rate of 0.5 cubic foot per hour through the inlet line to the chamber to provide the carbon component. Boron trichloride was supplied at the rate of 0.01 cubic foot per hour through the inlet line to the chamber to provide the boron component. The pressure in the chamber was maintained at 8 mm. of mercury. The mixutre of hafnium, boron and carbon derived from hafnium tetrachloride, boron trichloride and methane flowed through the chamber for a period of 80 minutes wherein a hafnium carbide-hafnium boride-graphite coating was deposited on the interior surface of the graphite tube.

The heat and gas supplies were discontinued. After the chamber was cooled to room temperature, the pressure was increased to atmospheric pressure and the apparatus was opened. The graphite member with the composite article deposited thereon was removed from the chamber. The resulting composite article comprised a graphite tube and a hafnium carbide-hafnium boride-graphite composite coating on the interior surface thereof. The hafnium carbide-hafnium boride-graphite composite coating consisted of a graphite matrix and an extremely fine disposition of hafnium carbide and hafnium boride in the matrix, the hafnium carbide being present in an amount of 40 atomic percent of the coating and the hafnium boride being present in an amount of eight atomic percent of the coating.

EXAMPLE VI

A deposition apparatus was set up in accordance with FIGURE 1 of the drawing. A graphite tube was positioned in the chamber of the apparatus. The chamber, including the interior of the tube, was evacuated to a pressure of $10^{-2}$ mm. of mercury. Power was supplied through the electrical leads to the electrodes to heat the chamber to a temperature of 1650° C. Tantalum pentachloride was supplied from a boiler at 155° C. through a tube to the interior of the graphite tube to provide the carbide forming metal, tantalum. Methane was supplied at the rate of 0.27 cubic foot per hour through the inlet line to the chamber to provide the carbon component. Hydrogen was supplied at the rate of 0.1 cubic foot per hour through the inlet line to the chamber. The pressure in the chamber was maintained at 4 mm. of mercury. The mixture of tantalum, and carbon derived from tantalum pentachloride and methane flowed through the chamber for a period of three hours wherein a tantalum carbide-graphite coating was deposited on the interior surface of the graphite tube.

The heat and gas supplies were discontinued. After the chamber was cooled to room temperature, the pressure was increased to atmospheric pressure and the apparatus was opened. The graphite member with the composite article deposited thereon was removed from the chamber. The resulting composite article comprised a graphite tube and a tantalum carbide-graphite composite coating on the interior surface thereof. The tantalum carbide-graphite composite coating consisted of a graphite matrix and an extremely fine dispersion of tantalum carbide in the matrix.

EXAMPLE VII

A deposition apparatus was set up in accordance with FIGURE 1 of the drawing. A graphite tube was positioned in the chamber of the apparatus. The chamber, including the interior of the tube, was evacuated to a pressure of $10^{-2}$ mm. of mercury. Power was supplied through the electrical leads to the electrodes to heat the chamber to a temperature of 1600° C. Hafnium tetrachloride and tantalum pentachloride were supplied from a boiler at 125° C. through a tube to the interior of the graphite tube to provide the carbide forming metals, hafnium and tantalum. Methane was supplied at the rate of 0.27 cubic foot per hour through the inlet line to the chamber to provide the carbon component. Hydrogen was supplied at the rate of 0.1 cubic foot per hour through the inlet line to the chamber. The pressure in the chamber was maintained at 5 mm. of mercury. The mixture of hafnium, tantalum and carbon derived from hafnium tetrachloride, tantalum pentachloride and methane flowed through the chamber for a period of 2.5 hours, wherein a tantalum-hafnium carbide-graphite coating was deposited on the interior surface of the graphite tube.

The heat and gas supplies were discontinued. After the chamber was cooled to room temperature, the pressure was increased to atmospheric pressure and the apparatus was opened. The graphite member with the composite article deposited thereon was removed from the chamber. The resulting composite article comprised a graphite tube and tantalum-hafnium carbide-graphite composite coating on the interior surface thereof. The tantalum-hafnium carbide-graphite composite coating consisted of a graphite matrix and an extremely fine dispersion of tantalum-hafnium carbide in the matrix, the tantalum-hafnium carbide being present in an amount of 2 atomic percent of the coating.

What I claim as new and desire to secure by Letters Patent of the United States is:

1. A composite article consisting essentially of a graphite matrix, having an extremely fine dispersion of a metallic boride in said matrix, said metallic boride being present in an amount from 0.5 atomic percent to 95 atomic percent of said article.

2. A composite article comprising a member of high temperature material having a metallic boride-graphite composite coating contiguous therewith and adhered thereto, said metallic boride-graphite composite coating consisting of a graphite matrix, and an extremely fine dispersion of a metallic boride in said matrix, said metallic boride being present in an amount from 0.5 atomic percent to 95 atomic percent of said coating.

3. A composite article comprising a graphite matrix, and an extremely fine dispersion of a matallic carbide and a metallic boride in said matrix, said metallic carbide and metallic boride being present in an amount from 0.5 atomic percent to 95 atomic percent of the article.

4. A composite article comprising a member of high temperature material having a metallic carbide-metallic boride-graphite composite coating contiguous therewith and adhered thereto, said metallic carbide-metallic boride-graphite composite coating consisting of a graphite matrix, and an extremely fine dispersion of a metallic carbide and a metallic boride in said matrix, said metallic carbide and said metallic boride being present in an amount from 0.5 atomic percent to 95 atomic percent of said coating.

5. A deposition method which comprises providing a chamber, positioning at least one member in said chamber, evacuating said chamber, heating said chamber to a temperature in the range of 1300° C. to 2500° C., introducing into said chamber a flow of gas decomposable by heat into a finely dispersed mixture of boride forming metal, boron and carbon, and maintaining said chamber at a pressure from 0.5 to 100 millimeters of mercury, whereby a metallic boride-graphite composite coating is deposited on said member.

6. The deposition method substantially as recited in claim 5 wherein the flow of gas includes a first gaseous component selected from the group consisting of metal halides, metal carbonyls and organometallics, a second gaseous component selected from the group consisting of boron trichloride and trimethylborate and a third gaseous component consisting of a hydrocarbon.

References Cited

UNITED STATES PATENTS

| 3,003,860 | 10/1961 | Sermon et al. | 106—56 |
| 3,031,338 | 4/1962 | Bourdeau | 117—107.2 X |
| 3,309,183 | 3/1967 | Sermon et al. | 51—307 X |
| 3,311,554 | 3/1967 | McCurdy et al. | 51—307 X |
| 3,011,981 | 12/1961 | Soltes. | |

OTHER REFERENCES

Ceramic Age, August 1960, p. 40–41.

RALPH S. KENDALL, Primary Examiner

A. GOLIAN, Assistant Examiner

U.S. Cl. X.R.

23—204, 208, 209.4; 106—56; 117—106, 121; 61—307